United States Patent [19]

Taylor

[11] 4,190,844

[45] Feb. 26, 1980

[54] INK-JET PRINTER WITH PNEUMATIC DEFLECTOR

[75] Inventor: Terrence F. E. Taylor, Burgess Hill, England

[73] Assignee: International Standard Electric Corporation, New York, N.Y.

[21] Appl. No.: 881,708

[22] Filed: Feb. 27, 1978

[30] Foreign Application Priority Data

Mar. 1, 1977 [GB] United Kingdom ............... 08546/77

[51] Int. Cl.² ............................................ G01D 15/18

[52] U.S. Cl. ...................................................... 346/75

[58] Field of Search .............................. 346/75, 140 R

[56] References Cited

U.S. PATENT DOCUMENTS

| | | | |
|---|---|---|---|
| 3,595,994 | 7/1971 | Whitman | 346/75 X |
| 3,719,952 | 3/1973 | Elbaum | 346/75 |
| 3,810,194 | 5/1974 | Tokunaga | 346/75 |

*Primary Examiner*—Joseph W. Hartary

*Attorney, Agent, or Firm*—A. Donald Stolzy

[57] ABSTRACT

An ink-jet printer of the continuous-droplet-stream type which, in place of electro-static deflection of the stream, uses a pneumatic deflector. Deflection may be on an "on-off" basis for line at a time printing, or on a continuous basis for character-by-character printing. It may also be used in facsimile receivers.

2 Claims, 8 Drawing Figures

INK-JET PRINTER WITH PNEUMATIC DEFLECTOR

This invention relates to ink-jet printers.

According to the present invention there is provided an ink-jet printer comprising: a print-head consisting of a droplet generator, a droplet deflector, and a droplet catcher, the droplet deflector being a controlled pneumatic jet so directed at the stream of droplets which issue from the droplet generator as to deflect the stream from a first path to at least one other path whereby to vary the marking effect of the stream on a record web; an ink source interconnected to the print-head to deliver ink to the droplet generator; a supply of air under pressure to actuate the droplet generator and the droplet deflector; sensor elements to monitor the passage and position of the stream of droplets; and a central control unit to coordinate the control of the deflector with the passage and position of the droplet stream and with selective input signals relating to characters or pictures to be marked on the web.

An embodiment of the invention is described below with reference to the accompanying drawings, of which:

Figure 1:
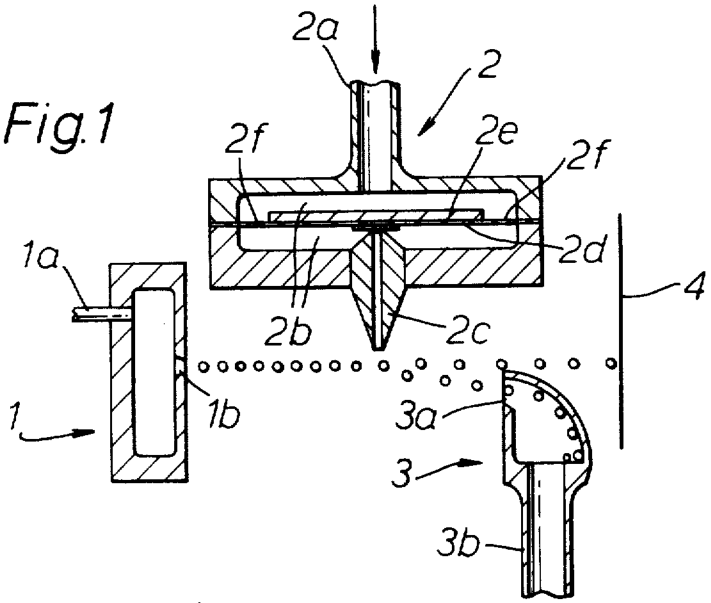
FIG. 1 shows the basic elements of a print-head using a stream of ink droplets.
Figure 2:
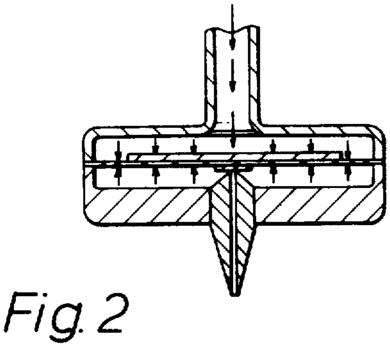
FIG. 2 shows the pressure conditions obtaining in one of the basic elements of FIG. 1, in a first condition.
Figure 3:
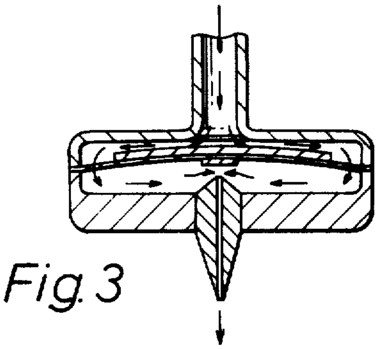
FIG. 3 shows the flow path for air in the basic element of FIGS. 1 and 2 in a second condition.

In the print-head of FIG. 1 there are three basic elements: a droplet generator 1, a droplet deflector 2, and a droplet catcher 3. The ink droplet generator is supplied with ink under pressure through an inlet 1*a* and the ink leaves the generator through a small orifice 1*b*, breaking up into a stream of droplets as it does so. If allowed to continue undisturbed the droplets would strike a record web 4 and make a mark. To prevent this in a selective manner there is situated close to the path of the droplets a deflector which can be controlled by electrical signals to deflect the droplets into a path which ends in the catcher. The deflector comprises a chamber having an inlet 2*a* through which air under pressure enters a chamber 2*b*. The chamber has a nozzle outlet 2*c*, and a diaphragm 2*d* which, by means of a piezo-electric or electro-strictive or other appropriate motor element 2*e*, can close or open the inner end of the nozzle. The diaphragm is perforated at 2*f* to allow the air pressure to equalize around it, as shown in FIG. 2, when the nozzle is closed, which occurs when there is a suitable control signal applied to the motor element 2*e*. When closed the droplet stream passing the nozzle is undeflected and strikes the record web. On the cessation of this signal or its replacement by a countermanding signal the nozzle is opened and air can emerge from the nozzle to deflect the droplets into the catcher and leave the record web unmarked. The ink entering the catcher through opening 3*a* flows away through outlet 3*b* to a sump (not shown in FIG. 1) from which it can be reused.

Figure 4:
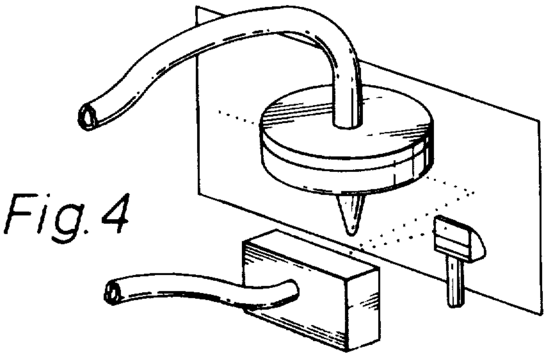
FIG. 4 shows schematically how the print-head of FIG. 1 moves in a first mode of operation to leave a trace on a record web.

The print-head can be used in two modes, a digital mode and an analogue mode. In the digital mode the droplets either follow a single path to the record web or a single path to the catcher. Thus by traversing the print-head across the width of the record web a continuous or broken line can be produced as required and characters, alphabetical, numerical, or otherwise, or a facsimile picture, can be built up by repeated traverses. as shown in FIG. 4.

Figure 5:
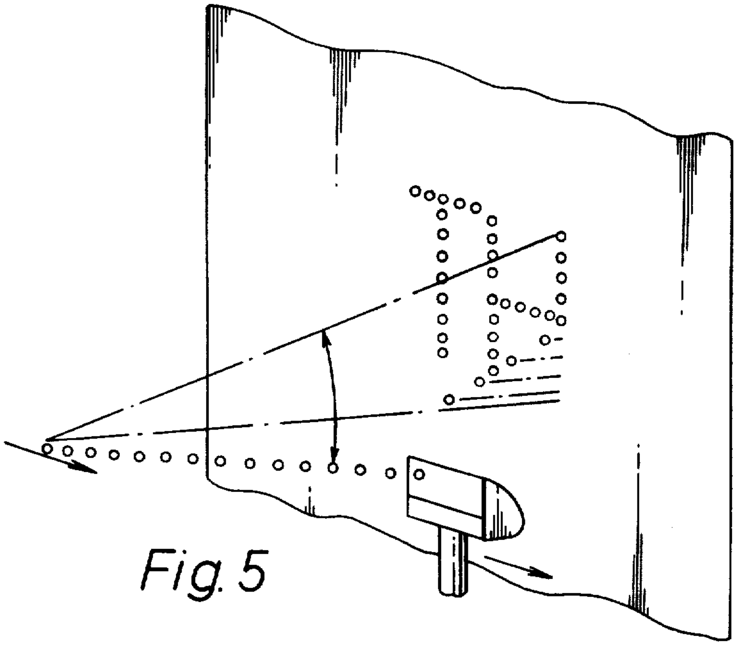
FIG. 5 shows how the print-head of FIG. 1 forms a character in a second mode of operation.

In the analogue mode use is made of the fact that by varying the displacement of the diaphragm from the end of the nozzle, a corresponding variation in the force of the air jet emerging from the nozzle can be obtained. Thus by applying a varying electrical signal, rather than two distinct signals for open and close, to the motor element the droplet stream can be deflected in a continuous manner from the orifice of the catcher up to a maximum point when the nozzle is completely closed. Thus, as shown in FIG. 5, alphabetic or numeric or other characters may be produced by forming them a column at a time. This mode is particularly suited to use in teleprinters or typewriters where characters arrive serially and there may be much variation in the times of arrival of adjacent characters.

Figure 6:
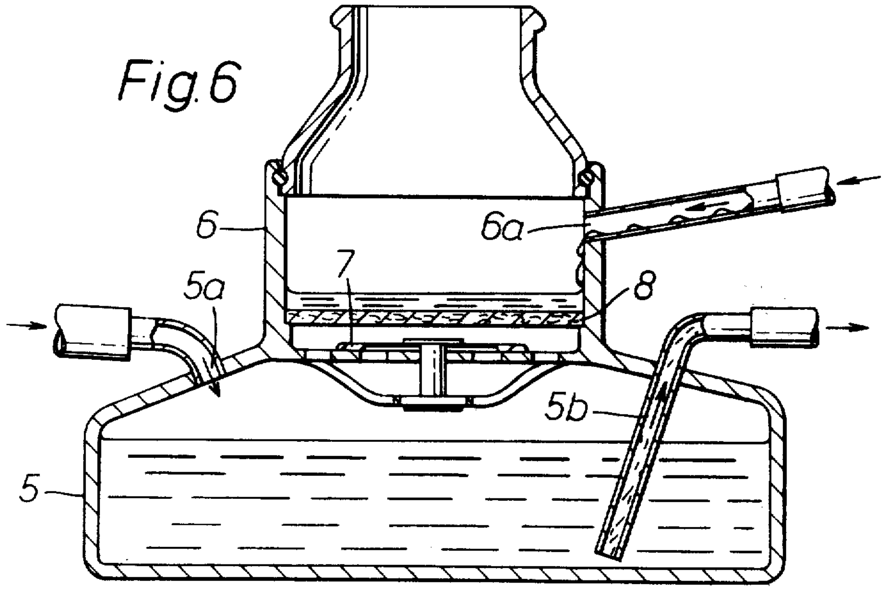
FIG. 6 shows an ink source for the print-head of FIG. 1.

FIG. 6 shows the ink supply for the print-head. A sump 5 holds the liquid ink. Air under pressure enters the sump at 5*a* and forces ink up the delivery tube 5*b* which connects to input 1*a* of the print-head. Above the sump is a receiver 6 into which flows ink from the catcher through an inlet 6*a*. The receiver and the sump are separated by a non-return valve 7 which permits accumulated ink, after passing through a filter 8, to pass into the sump, but prevents loss of air pressure from the sump.

Figure 7:
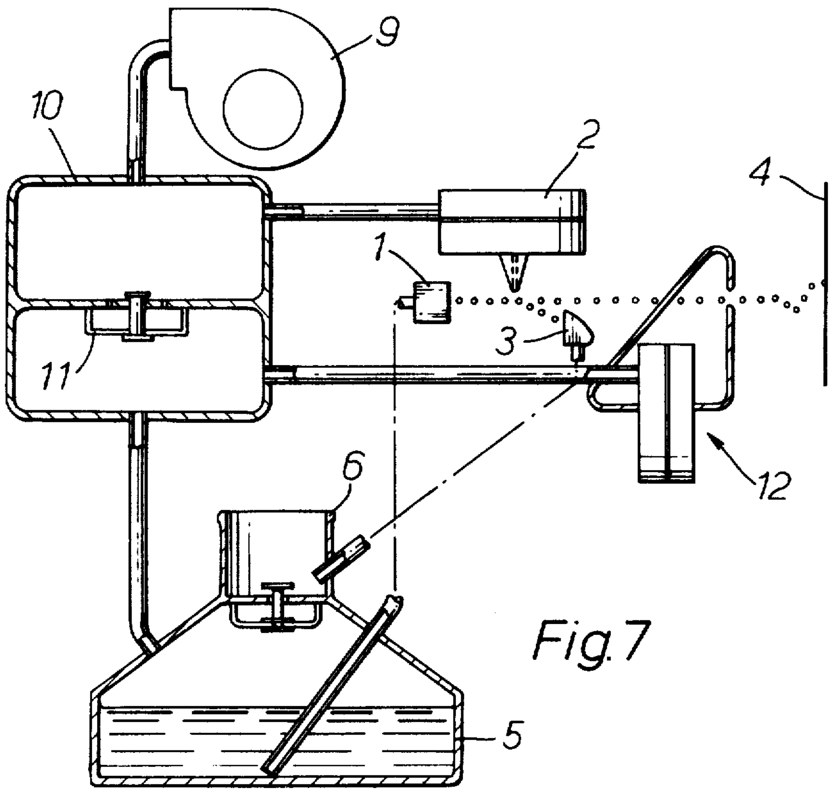
FIG. 7 shows schematically how print-head and ink source are interconnected.

FIG. 7 shows how the ink supply and the print-head are interconnected and how both are supplied with air under pressure from an air pump or compressor 9 through a two chambered accumulator 10, having a non-return valve 11 between its chambers. One chamber connects with the deflector; the other connects with the ink supply. The arrangement also shows an extra element 12 which is a second deflector downstream from the deflector 2. This can modulate the stream which reaches it in an analogue mode in a regular manner, being in effect an oscillator, while the deflector 2 determines, in a digital manner which droplets shall or shall not reach the second deflector. The characters are formed on the record web in the same way as shown in FIG. 5.

Figure 8:
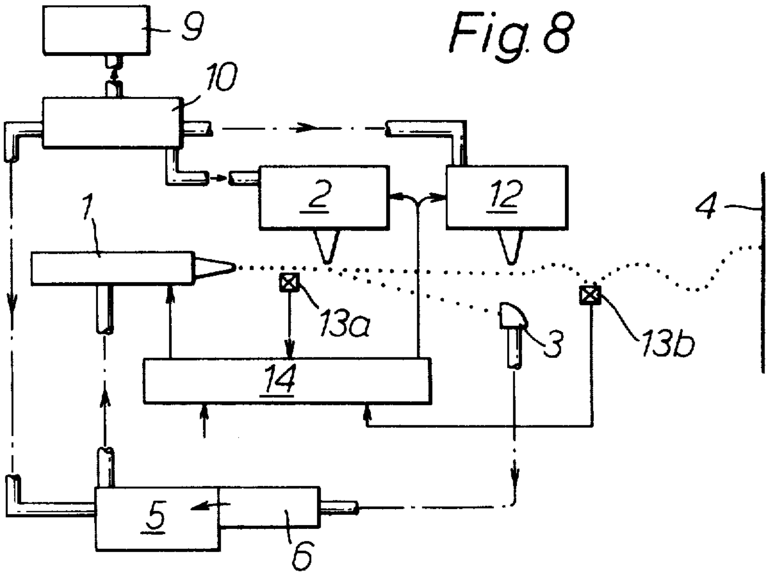
FIG. 8 complements FIG. 7 by showing control elements needed to form characters as desired.

Because of time lags along the various delivery pipes it is necessary that control signals be applied to the deflectors at the correct times to ensure well-formed characters or pictures. FIG. 8 shows how sensors 13*a* and *b* (photo-electric or proximity types) are positioned to detect the passage of the droplets between the droplet generator and the first deflector, sensor 13*a*, and to detect the amplitude of the analogue deflection caused by the second deflector, sensor 13*b*. The resulting signals are processed in a central control unit 14, the constructional details of which are not relevant in this description, which then puts out the necessary control signals to the first and second selectors, thus, for example, ensuring that the air jet from the first deflector does not blow on the gaps between droplets and cease as droplets pass the nozzle. The control unit also interprets input signals representative of the characters or pictures to be produced by the print-head.

I claim:

1. An ink-jet printer comprising: a print-head including a droplet generator, a first droplet deflector, and a droplet catcher, said first droplet deflector being a controlled pneumatic jet so directed at the stream of droplets which issue from said droplet generator as to deflect said stream from a first path to at least one other path whereby to vary the marking effect of said stream on a record web; an ink source interconnected to the print-head to deliver ink to said droplet generator; a supply of air under pressure to actuate said droplet generator and said first droplet deflector; sensor elements to monitor the passage and position of said stream of droplets; a central control unit to coordinate the control of said first droplet deflector with the passage and position of said droplet stream and with selective input signals relating to characters or pictures to be marked on said web; a second droplet deflector downstream from said first droplet deflector said second droplet deflector deflecting those portions of said stream which reach it in an oscillatory manner, said first droplet deflector, when appropriately controlled by signals, determining what portions of said stream reach the second droplet deflector.

2. A printer as claimed in claim 1 in which the deflector is supplied with air under pressure and has an outlet nozzle whose entrance is controlled by a diaphragm within the deflector, the diaphragm being controlled by a piezo-electric or electrostrictive or other similar motor element in response to signals from the control unit.

* * * * *